United States Patent [19]

Majumdar et al.

[11] Patent Number: 5,723,393
[45] Date of Patent: Mar. 3, 1998

[54] ZIRCONIA CERAMIC ARTICLE

[75] Inventors: Debasis Majumdar; Dilip K. Chatterjee; Syamal K. Ghosh, all of Rochester, N.Y.

[73] Assignee: Eastman Kodak Company, Rochester, N.Y.

[21] Appl. No.: 812,809

[22] Filed: Mar. 6, 1997

[51] Int. Cl.$^6$ ............................ C04B 35/20; C04B 35/48
[52] U.S. Cl. .................. 501/104; 501/122; 501/152; 501/154
[58] Field of Search ........................ 501/104, 122, 501/152, 154

[56] References Cited

U.S. PATENT DOCUMENTS

| | | | |
|---|---|---|---|
| Re. 32,449 | 6/1987 | Claussen et al. | 501/104 |
| 4,035,191 | 7/1977 | Johns | 501/104 |
| 4,279,655 | 7/1981 | Garvie et al. | 501/104 |
| 4,294,795 | 10/1981 | Haga et al. | 501/104 |
| 4,525,464 | 6/1985 | Claussen et al. | 501/104 |
| 4,587,225 | 5/1986 | Tsukuma et al. | 501/104 |
| 4,626,518 | 12/1986 | Watanabe et al. | 501/104 |
| 4,835,123 | 5/1989 | Bush et al. | 501/104 |
| 5,336,282 | 8/1994 | Ghosh et al. | 501/104 |
| 5,358,913 | 10/1994 | Chatterjee et al. | 501/104 |
| 5,419,827 | 5/1995 | Nanataki et al. | 501/104 |

FOREIGN PATENT DOCUMENTS

| | | | |
|---|---|---|---|
| 05-32826 | 12/1993 | Japan . | |
| 05-345304 | 12/1993 | Japan . | |
| 2065632 | 7/1981 | United Kingdom | 501/104 |
| 83/04247 | 12/1983 | WIPO | 501/104 |

OTHER PUBLICATIONS

Laponite Product Bulletin, Laponite RDS, by Laponite Industries, Ltd. of United Kingdom through its U.S. subsidiary, Southern Clay Products, Inc., Gonzales, Texas no date.

*Primary Examiner*—Anthony Green
*Attorney, Agent, or Firm*—Carl F. Ruoff

[57] ABSTRACT

The present invention is a ceramic article of magnesium-X silicate, wherein X represents lithium, sodium or, from about 0.1 to 2 weight percent, and yttria stabilized zirconia from about 99.9 to 98 weight percent wherein the yttria stabilized zirconia has a molar ratio of yttria to zirconia of from 0.5:99:5 to 5:95.

8 Claims, No Drawings

ZIRCONIA CERAMIC ARTICLE

CROSS REFERENCE TO RELATED APPLICATIONS

This application relates to commonly assigned copending application Ser. No. 08/812,813, which is filed simultaneously herewith and hereby incorporated by reference for all that it discloses. This application relates to commonly assigned copending Ser. No. 08/812,809, which is filed simultaneously and hereby incorporated by reference for all that it discloses.

FIELD OF THE INVENTION

This invention relates generally to the field of injection molding of inorganic materials and more particularly to low pressure, room temperature injection molding of particulate zirconia, its composites, and other particulate ceramics for manufacture of low cost, high precision, and complex shaped parts.

BACKGROUND OF THE INVENTION

Experience indicates that yttria-doped tetragonal zirconia polycrystal (Y-TZP) ceramic materials offer many advantages over conventional materials. Y-TZP is one of the toughest ceramics. The toughness is achieved at the expense of hardness and/or strength. A tetragonal zirconia alloy-alumina composite, that is, the product of sintering a particulate mixture of zirconia alloy and alumina, is another tough and relatively hard and strong structural ceramic composite. Tetragonal zirconia polycrystal (TZP) ceramics and their composites are characterized by high strength, high fracture toughness, superior wear, and abrasion resistances. Because of their attractive properties, these materials are suitable candidates for high precision punch, die, slitter knives, hydro-dynamic bearings, and various machine components. Unfortunately, the manufacturing processes for these ceramics and composites are difficult and are very costly primarily because of labor intensive machining processes to produce high precision complex shaped parts. Injection molding, however, is a technique which can be successfully utilized to manufacture large volumes of complex shaped parts in a cost effective way. Injection molding of inorganic powders with very fine particulate size, such as for zirconia ceramic, particularly tetragonal zirconia, and a wide variation in particle size such as in composites, pose a multitude of manufacturing problems, and the novelty of our invention relates to overcoming a plurality of such manufacturing problems. In order to produce tetragonal zirconia polycrystals (TZP), pure zirconia needs to be alloyed with a stabilizing agent(s), and its crystallite size needs to be maintained at a submicron level, preferably at or below 0.3 µm. The composite ceramic materials of interest to this invention are composites of zirconia or alumina with either oxide or non-oxide inorganic particulates. Some of the examples of the composites in this invention are $ZrO_2$—$Al_2O_3$, $ZrO_2$—$TiB_2$, $ZrO_2$—$SiC$, $ZrO_2$—$Si_3N_4$, $ZrO_2$—$AlN$, $Al_2O_3$—$ZrO_2$, and other composites primarily based on inorganic oxides, carbides, nitrides, borides, and silicides. In the case of composites, the particle size distribution between the components of the composites normally have a wide range of variation.

Prior art in the field of injection molding of inorganic materials indicates that the inorganic materials normally have a narrow range of variation in their particle size distribution; injection pressure, temperature, and velocity are normally very high.

The prior art fails to teach the use of ceramic composites having a wide variation of particle sizes in a low pressure, low temperature, and low velocity injection molding process.

Almost all the prior art in the field of injection molding fails to teach the molding process which is effective at ambient temperature. Generally, any manufacturing process at ambient temperature provides a multitude of advantages wherein close control of temperature dependent variables, such as injection pressure and viscosity of the injected materials is not warranted.

The present invention provides a room temperature, low pressure method of injection molding of inorganic materials, particularly ceramics. The present invention also allows injection molding of inorganic particles having bimodal particle distributions.

It is imperative that the final injection molded components maintain the same crystallographic structure as that of the starting materials. Additives, particularly the binders used in injection molding processes can cause structural changes in the final components. It is important that for injection molding of TZP and its composites the zirconia should be essentially tetragonal in structure. In the present invention the choice of binder is magnesium-X silicate in a solvent wherein X represents lithium, sodium, potassium or other monovalent ion.

SUMMARY OF THE INVENTION

The present invention is a ceramic article of magnesium-X silicate wherein X represents lithium, sodium or potassium from about 0.1 to 2 weight percent, and yttria stabilized zirconia from about 99.9 to 98 weight percent wherein the yttria stabilized zirconia has a molar ratio of yttria to zirconia of from 0.5:99:5 to 5:95.

The present ivention is also a ceramic article comprising of magnesium-X silicate, wherein X represents lithium, sodium or potassium from about 0.1 to 2 weight percent, and stabilized zirconia from about 99.9 to 98 weight percent zirconia wherein the stabilized zirconia has a molar ratio of a secondary oxide to zirconia of from 0.5:99:5 to 15:85 wherein the secondary oxide is selected from the group consisting of MgO, CaO, $Sc_2O_3$ and $CeO_2$.

Advantageous Effect of the Invention

The present invention has the following advantages:

1. It provides a cost effective method for manufacturing "net" or "near-net" shape parts/components.

2. It makes large volume production of parts of ceramics and composites feasible.

3. The initial tooling costs are low due to the low pressure and ambient temperature requirements.

4. It makes possible injection molding of ceramics and composites having variable particle size distribution.

5. It utilizes a water based binder system, which eliminates the need for the lengthy and costly debinding step essential for typical injection molding processes.

6. Inorganic binders when used in compounding processes, often cause crystallographic changes in the final injection molded components, the present invention provides a binder in which crystallographic changes are minimized.

DETAILED DESCRIPTION OF THE INVENTION

The present invention provides a method of injection molding ceramic powders using a binder containing magnesium-X silicate in a solvent wherein X is lithium, sodium or potassium. The binder allows one to adjust the viscosity of the injectable ceramic composition so that ambient temperature, low pressure injection molding is possible. Additionally, the use of binder containing magnesium-X silicate allows one to adjust the viscosity of the injectable ceramic composition dependent on particle size, particle size distribution and ceramic composition.

In the method of this invention, a ceramic powder, zirconium oxide (zirconia) alloy, or a mixture of particulate zirconium oxide (zirconia) alloy, and a second concentration of aluminum oxide (alumina) is used for making ceramic injection molded articles, as discussed fully below.

The method commences with a stabilization of the zirconia. Initially zirconia is stabilized by alloying with a selected chemical species. The zirconium oxide alloy consists essentially of zirconium oxide and a secondary oxide selected from the group consisting of MgO, CaO, $Y_2O_3$, $Sc_2O_3$ and $CeO_2$, or a combination thereof. Moreover, the zirconium oxide alloy has a concentration of the secondary oxide: in the case of $Y_2O_3$, of about 0.5 to about 5 mole percent; in the case of MgO, about 0.1 to about 1.0 mole percent; in the case of $CeO_2$, about 0.5 to about 15 mole percent; in the case of $Sc_2O_3$, about 0.5 to about 7.0 mole percent; and in the case of CaO from about 0.5 to about 5 mole percent, relative to the total moles of said zirconium oxide alloy.

The magnesium-X silicate wherein X represents lithium, sodium or potassium is a commercially available synthetic smectitie clay which closely resembles the natural clay mineral hectorite in both structure and composition. Hectorite is a natural swelling clay which is relatively rare and occurs contaminated with other minerals such as quartz which are difficult and expensive to remove. Synthetic smectite is free from natural impurities, and is prepared under controlled conditions. One such synthetic smectite clay is commercially marketed under the tradename Laponite® by Laponite Industries, Ltd. of United Kingdom through its U.S subsidiary, Southern Clay Products, Inc. It is a three-layered hydrous magnesium-X silicate wherein X represents lithium, sodium or potassium, in which magnesium ions, partially replaced by suitable monovalent ions such as lithium and/or vacancies, are octahedrally bound to oxygen and/or hydroxyl ions, some of which may be replaced by fluorine ions, forming the central octahedral sheet; such an octahedral sheet is sandwiched between two tetrahedral sheets of silicon ions, tetrahedrally bound to oxygen.

There are many grades of Laponite® such as RD, RDS, J, S and others, each with unique characteristics and can be used for the present invention. Some of these products contain a polyphosphate peptizing agent such as tetrasodium pyrophosphate for rapid dispersion capability; alternatively, a suitable peptizer can be incorporated into Laponite® subsequently for the same purpose. A typical chemical analysis and physical properties of Laponite® RDS are as follows:

TABLE 1

Typical Chemical Analysis

| Component | Weight % |
|---|---|
| $SiO_2$ | 54.5 |
| MgO | 26.0 |
| $Li_2O$ | 0.8 |
| $Na_2O$ | 5.6 |
| $P_2O_5$ | 4.1 |
| Loss on ignition | 8.0 |

TABLE 2

Typical Physical Properties

| Appearance | White Powder |
|---|---|
| Bulk density | 1000 kg/m$^3$ |
| Surface Area | 330 m$^2$/g |
| pH (2% suspension) | 9.7 |
| Sieve analysis | 98% < 250µ |
| Moisture content | 10% |

Having a layered clay type structure, Laponite® separates into tiny platelets of lateral dimension of 25–50 nm and a thickness of 1–5 nm in deionized aqueous dispersion, commonly referred to as sols. Typical concentration of Laponite in a sol can be 0.1 percent to 10 percent. During dispersion in deionized water an electrical double layer forms around the clay platelets resulting in repulsion between them and no structure build up. However, in a formula containing electrolytes introduced from tap water or other ingredients, the double layer can be reduced resulting in attraction between the platelets forming a "house of cards" structure. Owing to the ionic nature of these bonds they can be easily broken or reformed, resulting in a highly thixotropic rheology with low viscosity under shear and a high yield value. This distinctive thixotropic rheology is utilized in the present invention. Illustration of Laponite's shear thinning rheology and viscosity build after removal of shear is found in Technical bulletin TB-3, Laponite Properties and Applications, published by Southern Clay Products.

Zirconia alloys are available commercially. For example, particulate zirconia alloy having 3 mole percent $Y_2O_3$ is marketed by Z-TECH Corporation, Bow, N.H., as "SYP-ULTRA 5.2 Yttria Stabilized Zirconia" or by TOSHO Corporation of Japan, as "TZ-3YB."

One of the preferred materials which we use in the method of this invention is a zirconia alloy ($ZrO_2$) powder having 100% tetragonal crystal structure. This 100% tetragonal zirconia is formed by alloying zirconia with a number of secondary oxides as taught in U.S. Pat. Nos. 5,336,282 and 5,358,913.

Another preferred ceramic powder mixture that was successfully used in the method of making zirconia-alumina ($ZrO_2$—$Al_2O_3$) composites of the invention includes a particulate zirconia alloy and a particulate alumina made by mixing $ZrO_2$ and additional "secondary oxide" selected from MgO, CaO, $Y_2O_3$, $Sc_2O_3$ and $CeO_2$ (also referred to herein as "Mg—Ca—Y—Sc-rare earth oxides") and then with $Al_2O_3$. Zirconia alloys useful in the methods of the invention have a metastable tetragonal crystal structure in the temperature and pressure ranges at which the ceramic article to be produced will be used. For example, at temperatures up to about 200° C. and pressures up to about 1000 MPa, zirconia alloys having a concentration of secondary oxide, in the case of $Y_2O_3$, of about 0.5 to about 5 mole percent; in the case of MgO, about 0.1 to about 1.0 mole percent; in the case of $CeO_2$, about 0.5 to about 15 mole percent; in the case of $Sc_2O_3$, about 0.5 to about 7.0 mole percent; and in the case of CaO, from about 0.5 to about 5 mole percent, relative to the total moles of said zirconium oxide alloy, exhibit a 100% tetragonal structure. Preferred oxides for alloying with zirconia are $Y_2O_3$, MgO, CaO, $Ce_2O_3$, and combinations of these oxides. It is preferred that the zirconia powder have high purity, greater than about 99.9 percent. Specific examples of useful zirconia alloys include tetragonal structure zirconia alloys having from about 2 to about 5 mole percent $Y_2O_3$ or more preferably about 3 mole percent $Y_2O_3$.

Examples of tetragonal structure zirconia alloys useful in the methods of the invention are disclosed in U.S. Pat. No. 5,290,332. Such zirconia alloys are described in that patent as being useful to provide a "net-shape" ceramic article: a ceramic article that is dimensionally true after sintering and therefore does not necessitate further machining prior to use in its intended working environment.

The next step of the process is to compound an injection molding composition. This is achieved by mixing mechanically the binder comprising magnesium-X silicate wherein X represents lithium, sodium or potassium and solvent with the ceramic or composite powders. The preferred solvent is water. Water-miscible solvents such as ethnaol, ethylene glycol and acetone can be mixed with water.

An example of convenient particulate characteristics for a particular embodiment of the invention is the following: Purity of zirconia alloy ($ZrO_2$) is preferably well controlled at 99.9 to 99.99 percent; that is, impurities are no more than about 0.1 to 0.01 percent. The particle size is from about 0.1 μm to about 0.6 μm. The average grain size is 0.3 μm. The distribution of particle sizes is: 5–15 percent less than 0.1 μm, 40–60 percent less than 0.3 μm, and 85–95 percent less than 0.6 μm. The surface area of each individual particle ranges from about 10 to about 15 $m^2$/gram or is preferably 14 $m^2$/gram. Agglomerate size is from about 30 to about 60 μm and average agglomerate size is 40–60 μm. Moisture content is about 0.2 to 1.0 percent by volume and is preferably 0.5 percent. The particle size of alumina used to form the composites is from 0.5 to 1.5 μm with the average being 1.0 μm.

The zirconia alloy used for these composites are the same as described above. The distribution of particles sizes of alumina is: 5 to 15 percent less than 0.5 μm, 40 to 60 percent less than 1.0 μm, and 85 to 95 percent less than 1.5 μm. Surface area of each individual particle of $Al_2O_3$ used in the present invention ranges from about 6 to 10 $m^2$/g. The agglomerate size of these alumina powders is from about 50 to 80 μms.

Compounding is the process in which the ceramic particulate mixture or mixtures are stirred with the binder, in this case a sol containing magnesium-X silicate wherein X is lithium, sodium or potassium in a ratio such that the dry weight percent of the magnesium-X silicate in the final ceramic part is between 0.1 and 2 weight percent. The preferred weight percent of the magnesium-X silicate in the final part is 0.6 weight percent.

After the ceramic mixture is compounded, it is injection molded and sintered. The apparatus used to perform the injection molding was a Peltsman, model MIGL-33. The compounded mixture of the inorganic particulates and binder was placed in a pot of the injection molding apparatus. The pot is equipped with a motor driven mixer and is pressurized via a port. The compounded mixture and inorganic particulates and binder are transferred to a mold via a transfer tube and a ball valve. The ball valve is regulated by a pneumatic transducer which makes the ball valve open or close on demand. As the compounded mixture is pressurized in the pot, the material flows through the transfer tube to the mold to form the "green ceramic" article when the ball valve is opened. A clamping cylinder maintains the compounded mixture within the mold. Injection of the compounded material into the mold was made at a pressure of 10–70 psi for 20–40 seconds while maintaining the temperature of the pot, transfer tube and its orifice at ambient. The mold was also kept at ambient temperature. It should be noted here that all the prior art related to this invention utilized elevated temperature in the pot, transfer tube, orifice and mold. The mold was unclamped from the machine and allowed to cool and the "green ceramic" or "green composite" articles were taken out.

Sintering of the green part is performed at a temperature range from about 1400° C. to about 1600° C., or more preferably about 1500° C. Preferable sintering times are in the range form about 1 hour to about 3 hours, or more preferably, about 2 hours. In a particular embodiment of the method of this invention, the sintering peak temperature is 1500° C. and that temperature was maintained for about 2 hours. It is preferred that the pre-sintered articles be slowly heated to sintering temperature and slowly cooled so as to avoid undesirable dimensional changes, distortions and crack development. In an embodiment of the invention having a preferred sintering temperature of about 1500° C., preferred temperature ramps during heating are: about 0.3° C./minute from room temperature to about 300° C.; about 0.1° C./minute from about 300° C. to about 400° C.; about 0.4° C./minute from about 400° C. to about 600° C. and about 1.5° C./minute from about 600° C. to about 1500° C.; about 2° C./minute from about 1500° C. to about 800° C.; about 1.6° C./minute from about 800° C. to room temperature.

The invention will now be illustrated by the following examples.

Binder solutions were prepared by mixing 0.2 to 10 percent magnesium-X silicate wherein X represents lithium, sodium or potassium (Laponite®) in deionized water by stirring overnight. The binder solution was added to inorganic particles in a rotary mixer and mixed for about 2 hours. In some cases, a surfactant was added during the mixing process. This mixing process is termed compounding, as described previously, and the resultant products are compounds.

WORKING EXAMPLE 1

Tetragonal $ZrO_2$ alloy and its composite with 20 percent alumina was compounded, as described above, with 28% by weight of a binder solution containing 2 percent Laponite®.

WORKING EXAMPLE 2

Tetragonal $ZrO_2$ alloy and its composites with 20 percent alumina was compounded, as described above, with 0.3% by weight neodyl (a surfactant available from Dupont) and 28% by weight of a binder solution containing 2 percent Laponite®.

WORKING EXAMPLE 3

The compounds in Examples 1 and 2 were injected into a mold at a pressure between 10 and 70 psi for about 0.5 to 20 seconds. The material and the mold were at ambient temperature. The injected materials were allowed to dry within the mold and then removed from the mold.

WORKING EXAMPLE 4

The green composite parts of zirconia and its alumina composites produced in Example 3 were sintered as described above.

COMPARATIVE EXAMPLE 1

Tetragonal $ZrO_2$ alloy and its composites with 20 percent alumina were compounded, as described above, with 23% by weight of a binder containing 2 percent Laponite®. The viscosity of this material was too high for injection in a mold. Increasing injection pressure up to 80 psi did produce complete mold fill.

COMPARATIVE EXAMPLE 2

Tetragonal $ZrO_2$ alloy and its composites with 20 percent alumina were compounded, as described above, with 32% by weight of a binder containing 2 percent Laponite®. The viscosity of this material was too low for injection in a mold.

COMPARATIVE EXAMPLE 3

Tetragonal $ZrO_2$ alloy and its composites with 20 percent alumina were compounded, as described above, with 0.3% by weight neodyl and with 23% by weight of a binder containing 2 percent Laponite®. The viscosity of this material was to high for injection in a mold.

COMPARATIVE EXAMPLE 4

Tetragonal $ZrO_2$ alloy and its composites with 20 percent alumina were compounded, as described above, with 0.3% by weight neodyl and with 32% by weight of a binder containing 2 percent Laponite®. The viscosity of this material was to low for injection in a mold.

COMPARATIVE EXAMPLE 5

Tetragonal $ZrO_2$ alloy and its composites with 20 percent alumina were compounded, as described above, with 28% by weight of a binder containing 10 percent Laponite®. The material was injection molded using the conditions described above and allowed to dry. This part produced using this compound cracked as it dried. The 10% Laponite® loaded binder is too high of a concentration for effective injection molding to produce useful parts.

It is clearly evident from the examples that magnesium-X silicate, wherein X represents lithium, sodium or potassium, can be used as a binder or compounding aid for ambient temperature and low pressure injection molding of not only very fine (about 0.3 μm average) particulate inorganic materials but also inorganic materials with a bimodal (0.3 μm and 1.0 μm average) particulate distribution. TZP and TZP based composites must have an essentially tetragonal crystal structure of zirconia in the final injection molded component to maintain high fracture toughness. The x-ray diffraction analysis conducted on some of the sintered injection molded components manufactured from Examples 1–4 demonstrate that the crystal structures of the zirconia oxide alloy were essentially tetragonal zirconia. X-ray diffraction analysis of molded components manufactured from Examples 1–4 of zirconia-alumina composites had a crystalline structure that was essentially tetragonal zirconia and α-alumina.

While the invention has been described with a certain degree of particularity, it is manifest that many changes may be made in the details of the construction and the arrangement of components without departing from the spirit and scope of the disclosure. It is understood that the invention is not limited to the embodiments set forth herein for purposes of exemplification, but is to be limited only by the scope of the attached claims, including the full range of equivalency to which each element thereof is entitled.

We claim:

1. A ceramic article comprising:
   magnesium-X silicate, wherein X represents lithium, sodium or potassium from about 0.1 to 2 weight percent;
   yttria stabilized zirconia from about 99.9 to 98 weight percent wherein the yttria stabilized zirconia has a molar ratio of yttria to zirconia of from 0.5:99:5 to 5:95.

2. The ceramic article of claim 1 wherein the yttria stabilized zirconia has an essentially tetragonal structure.

3. A ceramic article comprising:
   magnesium-X silicate, wherein X represents lithium, sodium or potassium from about 0.1 to 2 weight percent;
   stabilized zirconia from about 99.9 to 98 weight percent zirconia wherein the stabilized zirconia has a molar ratio of a secondary oxide to zirconia of from 0.5:99:5 to 15:85 wherein the secondary oxide is selected from the group consisting of MgO, CaO, $Sc_2O_3$ and $CeO_2$.

4. The ceramic article of claim 3 wherein the stabilized zirconia has an essentially tetragonal structure.

5. The ceramic article of claim 3 wherein the secondary oxide comprises MgO from about 0.1 to about 1.0 mole percent.

6. The ceramic article of claim 3 wherein the secondary oxide comprises $Ce_2O_3$ from about 0.5 to about 15 mole percent.

7. The ceramic article of claim 3 wherein the secondary oxide comprises $Sc_2O_3$ from about 0.5 to about 7.0 mole percent.

8. The ceramic article of claim 3 wherein the secondary oxide comprises CaO from about 0.5 to about 5 mole percent.

* * * * *